(12) United States Patent
Euculano et al.

(10) Patent No.: US 11,396,433 B1
(45) Date of Patent: Jul. 26, 2022

(54) BULK BAG CONDITIONER

(71) Applicant: Flexicon Corporation, Bethlehem, PA (US)

(72) Inventors: Jason Steven Euculano, Northampton, PA (US); Daniel Joel Barry, Nazareth, PA (US); John Stephen Szazdi, Jr., Northampton, PA (US)

(73) Assignee: FLEXICON CORPORATION, Bethlehem, PA (US)

( * ) Notice: Subject to any disclaimer, the term of this patent is extended or adjusted under 35 U.S.C. 154(b) by 0 days.

(21) Appl. No.: 17/201,642

(22) Filed: Mar. 15, 2021

(51) Int. Cl.
*B65G 69/08* (2006.01)

(52) U.S. Cl.
CPC .................... *B65G 69/08* (2013.01)

(58) Field of Classification Search
CPC ........................................ B65G 69/08
See application file for complete search history.

(56) References Cited

U.S. PATENT DOCUMENTS

| | | | |
|---|---|---|---|
| 5,788,449 A | 8/1998 | Riemersma | |
| 6,312,151 B1 | 11/2001 | Pendleton | |
| 8,181,568 B1 | 5/2012 | Hofman et al. | |
| 8,567,312 B2 | 10/2013 | Hofman et al. | |
| 9,126,705 B2* | 9/2015 | Ours | B65B 5/101 |
| 9,149,743 B2* | 10/2015 | Conwell | B01D 29/114 |
| 9,387,950 B2 | 7/2016 | Hofman et al. | |
| 10,167,102 B2* | 1/2019 | Rubitschung | B65B 39/007 |
| 10,266,296 B2* | 4/2019 | Roozen | B65B 7/02 |
| 10,745,165 B2 | 8/2020 | Nakai | |
| 11,230,401 B2* | 1/2022 | Hofman | B65D 88/66 |
| 2015/0175280 A1 | 6/2015 | Dudas et al. | |
| 2015/0360431 A1 | 12/2015 | Halvorsen et al. | |
| 2020/0048985 A1* | 2/2020 | Oehler | E21B 34/06 |

FOREIGN PATENT DOCUMENTS

| | | |
|---|---|---|
| CN | 205150406 U | 4/2016 |
| CN | 208233486 U | 12/2018 |
| FR | 2749823 A1 | 12/1997 |

(Continued)

OTHER PUBLICATIONS

Palamatic Process; "Big Bag Puncher—CDM125 | Palamatic Process" (Website: https://www.palamaticprocess.com/bulk-handling-equipment/big-bag-side-puncher); Retrieved Oct. 26, 2020 (4 pages).

(Continued)

*Primary Examiner* — Saul Rodriguez
*Assistant Examiner* — Ashley K Romano
(74) *Attorney, Agent, or Firm* — Volpe Koenig (57) ABSTRACT

A bulk bag conditioner assembly is disclosed herein. The assembly includes a frame assembly defining a bulk bag conditioning area. The frame assembly includes a first carrier frame with a first ram, and a second carrier frame with a second ram. A first actuator assembly includes a first end fixed to the first carrier frame and a second end fixed to the second carrier frame. A second actuator assembly includes a first end fixed to the first carrier frame and a second end fixed to the second carrier frame. A control unit is configured to simultaneously drive the first ram and the second ram linearly towards each other to engage a bulk bag within the bulk bag conditioning area.

20 Claims, 13 Drawing Sheets

(56) References Cited

FOREIGN PATENT DOCUMENTS

| JP | H0824701 A | 1/1996 |
|---|---|---|
| JP | 3467732 B2 | 11/2003 |
| WO | 2019193485 A1 | 10/2019 |

OTHER PUBLICATIONS

Con-V-Air Solutions; "BBU—Bulk Bag Unloader" (Website: https://con-v-airsolutions.com/en/bulk-bag-unloader_v2,php?gclid=EAlaIQobChMljOahioui7AIVD9d3Ch3cqgFkEAMYASAAEgLb6vD_BwE) Retrieved Oct. 26, 2020. Copyright 2020 (4 pages).

Relco; "Power Handling—Bulk Bag Unloader" (Website: https://relco.net/product-solutions/bulk-bag-unloader/); Retrieved Oct. 26, 2020 (4 pages).

Spriroflow; "Bulk Bag Conditioner" (Website: https://academy.spiroflow.com/hubfs/Technical-Data-Sheets/8020-Bulk-Bag-Conditioner.pdf) Retrieved Mar. 18, 2021 (2 pages).

Material Transfer and Storage; "Bulk Bag Conditioners", (Website: https://materialtransfer.com/bulk-bag-conditioners/); Retrieved Mar. 17, 2021; Copyright 2020; (4 pages).

NBE—National Bulk Equipment / NBE Holdings Company; "Bulk Bag Conditioners" (Website: https://www.nbe-inc.com/processing-systems/bulk-bag-conditioners); Retrieved Mar. 17, 2021 (5 pages).

Custom Equipment Designs Inc. (CED); "Bulk Bag Conditioners" (Website: http://cedpackaging.net/ProductsCC/tabid/190/ID/10/categoryId/4/Bulk-Bag-Conditioners.aspx); Retrieved Mar. 17, 2021 (1 page).

Gimat SRL; "Bulk Bag Conditioners" (Website: https://www.gimatengineering.com/bulk-bags-dischargers-and-fillers-hoppers/bulk-bag-conditioner); Retrieved Mar. 17, 2021 (4 pages).

Vac-U-Max; "Vac-U-Max Bulk Bag Unloader" (Website: https://www.vac-u-max.com/product.cfm?cat=products-by-application&prod=bulk-bag-unloader); Retrieved Mar. 18, 2021 (2 pages).

\* cited by examiner

BULK BAG CONDITIONER

FIELD OF THE INVENTION

The present disclosure relates to the handling and processing of bulk bags, and is more particularly related to a bulk bag conditioner.

BACKGROUND

Bulk bags can be used to transport or store materials. The top of the bag can include an inlet and the bottom of the bag can include a closed end configured to hold the materials until emptying the contents of the bulk bag. Depending on the material within the bulk bags, bonds can form between particulates or clumping can occur for a variety of reasons. Accordingly, when the bottom of the bulk bag is later opened (e.g., via a spout or cutting the bag), then the bulk material will not flow and exit the bag.

It is known that breaking up the particulate material addresses these issues. Bulk bag conditioners are generally known for breaking apart particulate material in bulk bags to ensure that the material flows properly. One such configuration is shown by US Pub. 2015/0360431, which is commonly owned by the present Applicant (Flexicon Corporation) and is incorporated by reference as if fully set forth herein.

One known bulk bag conditioner includes an external frame or cage on which a pair of independently driven rams are mounted. The bulk bag is placed onto a vertical lift assembly or scissor lift, and the bulk bag is driven upward and downward to allow the rams to engage various regions on the bulk bag. The cages in these known bulk bag conditioners are required to fully enclose the bulk bag. Additionally, the cages include cross members or connecting members configured to ensure that the opposing sides of the cage remain connected with each other as the conditioning forces or crushing forces are applied via the rams. In these configurations, the full reactionary force of squeezing or engaging the bag is transferred through the external frame or cage.

These configurations suffer from multiples drawbacks. Any surrounding support members experience high loads during conditioning. High downward forces also act on the scissor lift due to elongation of the bulk bags when being engaged with the vertically fixed rams. Additionally, the bulk bags must be relatively centered between the opposing rams due to the bulk bags becoming off-centered or tipping during application of conditioning forces.

Therefore, a need exists for a more dynamic and durable bulk bag conditioner.

SUMMARY

A bulk bag conditioner assembly is disclosed herein. The bulk bag conditioner assembly comprises a frame assembly defining a bulk bag conditioning area. The frame assembly includes a first carrier frame including a first ram, a second carrier frame including a second ram, a first actuator assembly including a first end fixed to the first carrier frame and a second end fixed to the second carrier frame, and a second actuator assembly including a first end fixed to the first carrier frame and a second end fixed to the second carrier frame. A control unit is configured to simultaneously drive the first ram and the second ram linearly towards each other to engage a bulk bag within the bulk bag conditioning area.

The frame assembly includes a perimeter frame having a continuous and enclosed perimeter dimensioned to define the bulk bag conditioning area, in one aspect.

The control unit is preferably mounted directly on either the first carrier frame or the second carrier frame to minimize the length of the hydraulic hose.

In one embodiment, the first and second carrier frames each rolling elements or bearing elements such that the carrier frames can be driven linearly towards each other to engage a bulk bag.

In one embodiment, the perimeter frame includes a first support rail, a second support rail, and a pair of guide rails connecting the first support rail and the second support rail. The pair of guide rails can each define roller tracks configured to define paths for a plurality of rollers of the first and second carrier frames.

A vertical lifting assembly can be provided that is configured to raise and lower the frame assembly relative to the bulk bag. In another embodiment, the bulk bag can be raised and lowered, while the perimeter frame remains stationary.

In one aspect, the first actuator assembly is arranged on a first side of the frame assembly, the second actuator assembly is arranged on a second side of the frame assembly, and the second side is opposite from the first side.

In one aspect, the carrier frames each have a H-shaped profile including a pair of legs and a frame body extending therebetween, and the pair of legs each include a plurality of rollers.

A support base can be provided that is configured to support a bulk bag within the frame assembly. A vertical lifting assembly configured to raise and lower the frame assembly can also be provided.

A method of conditioning a bulk bag is also disclosed herein. The method includes providing a bulk bag conditioner assembly comprising a frame assembly including a perimeter frame with an enclosed perimeter. The frame assembly includes a first ram, a second ram, and an actuator assembly commonly linked to both the first ram and the second ram. A vertical lifting assembly is provided and is configured to raise and lower the bulk bag conditioner assembly. The method includes positioning a bulk bag above or below the bulk bag conditioner assembly. The method also includes raising or lowering the bulk bag conditioner via the vertical lifting assembly such that the first ram and the second ram are facing at least a portion of the bulk bag. The method includes activating the actuator assembly such that the first ram and second ram are simultaneously driven linearly towards each other and engage the bulk bag to condition the bulk bag.

Additional embodiments are described herein.

BRIEF DESCRIPTION OF THE DRAWINGS

The foregoing Summary as well as the following Detailed Description will be readily understood in conjunction with the appended drawings which illustrate preferred embodiments of the invention. In the drawings.

DETAILED DESCRIPTION

Certain terminology is used in the following description for convenience only and is not considered limiting. The words "right," "left," "lower" and "upper" designate directions in the drawings to which reference is made. This terminology includes the words specifically noted above, derivatives thereof and words of similar import. Additionally, the terms "a" and "one" are defined as including one or more of the referenced items unless specifically noted.

As shown in FIGS. 1-10C, a bulk bag conditioner assembly 10 is disclosed. The bulk bag conditioner assembly 10 generally includes a frame assembly 12, a first actuator assembly 40, and a second actuator assembly 50. The first and second actuator assemblies 40, 50 are generally configured to drive rams 24, 34 toward each other, which is described in more detail herein. The term actuator assembly is used to refer to any type of actuating unit in which motion can be imparted. In one aspect, the actuator assemblies are hydraulic cylinder assemblies. In another aspect, the actuator assemblies are ball screw actuators. One skilled in the art would understand that any other type of actuators could be used. The actuator assemblies are interchangeably referred to as hydraulic cylinder assemblies herein.

In one aspect, the first hydraulic cylinder assembly 40 and the second hydraulic cylinder assembly 50 are linked with each other such that the hydraulic cylinder assemblies 40, 50 are configured to simultaneously drive the first ram 24 and the second ram 34 linearly towards each other to engage a bulk bag 5. The first hydraulic cylinder assembly 40 and the second hydraulic cylinder assembly 50 are both configured to be driven by a common control unit or hydraulic power unit 70, which is described in more detail herein.

Although two hydraulic cylinder assemblies 40, 50 are illustrated in the drawings, one skilled in the art would understand that more than two hydraulic cylinder assemblies may be used.

Figure 5:
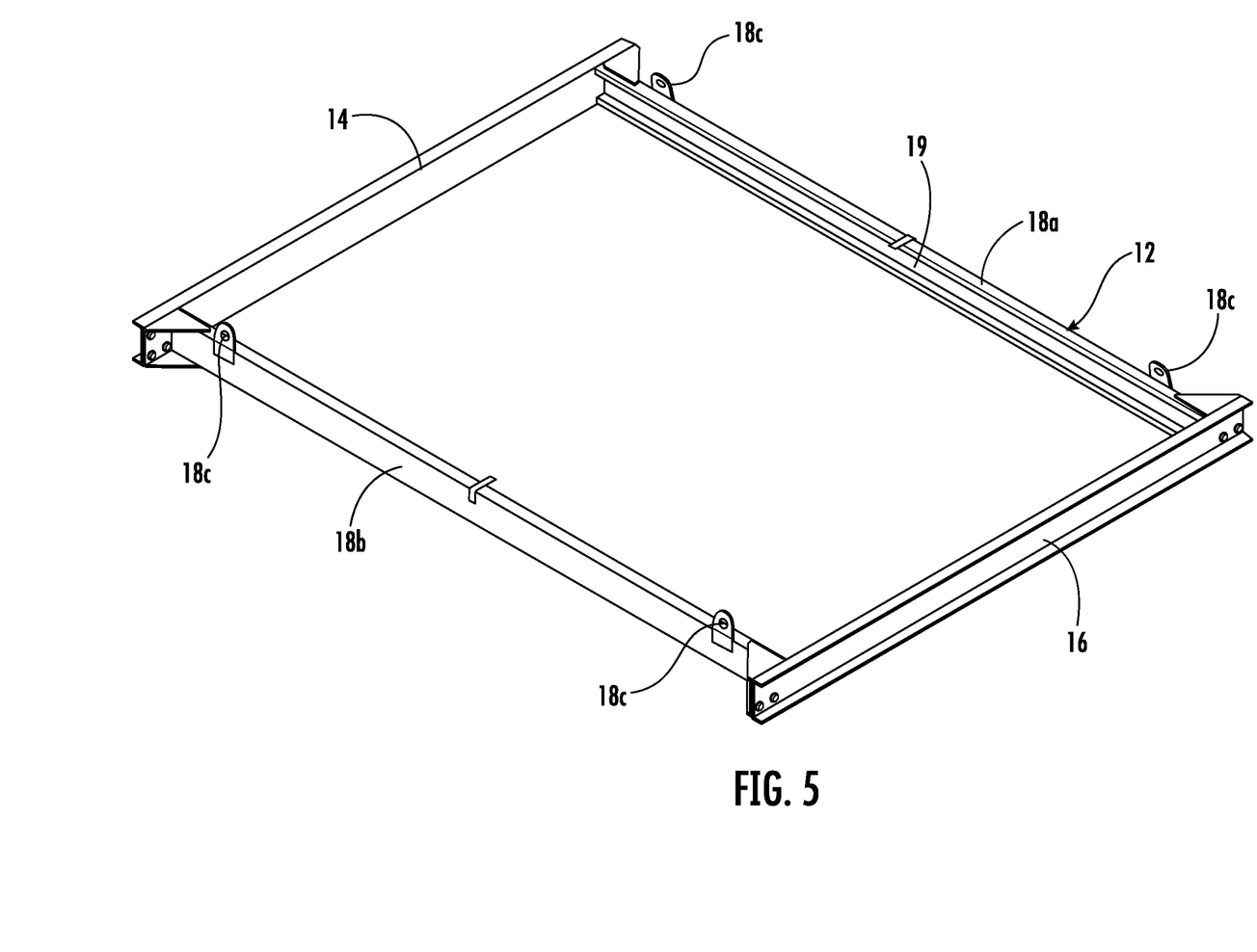
FIG. 5 is a perspective view of a frame assembly of the bulk bag conditioner assembly.
Figure 6:
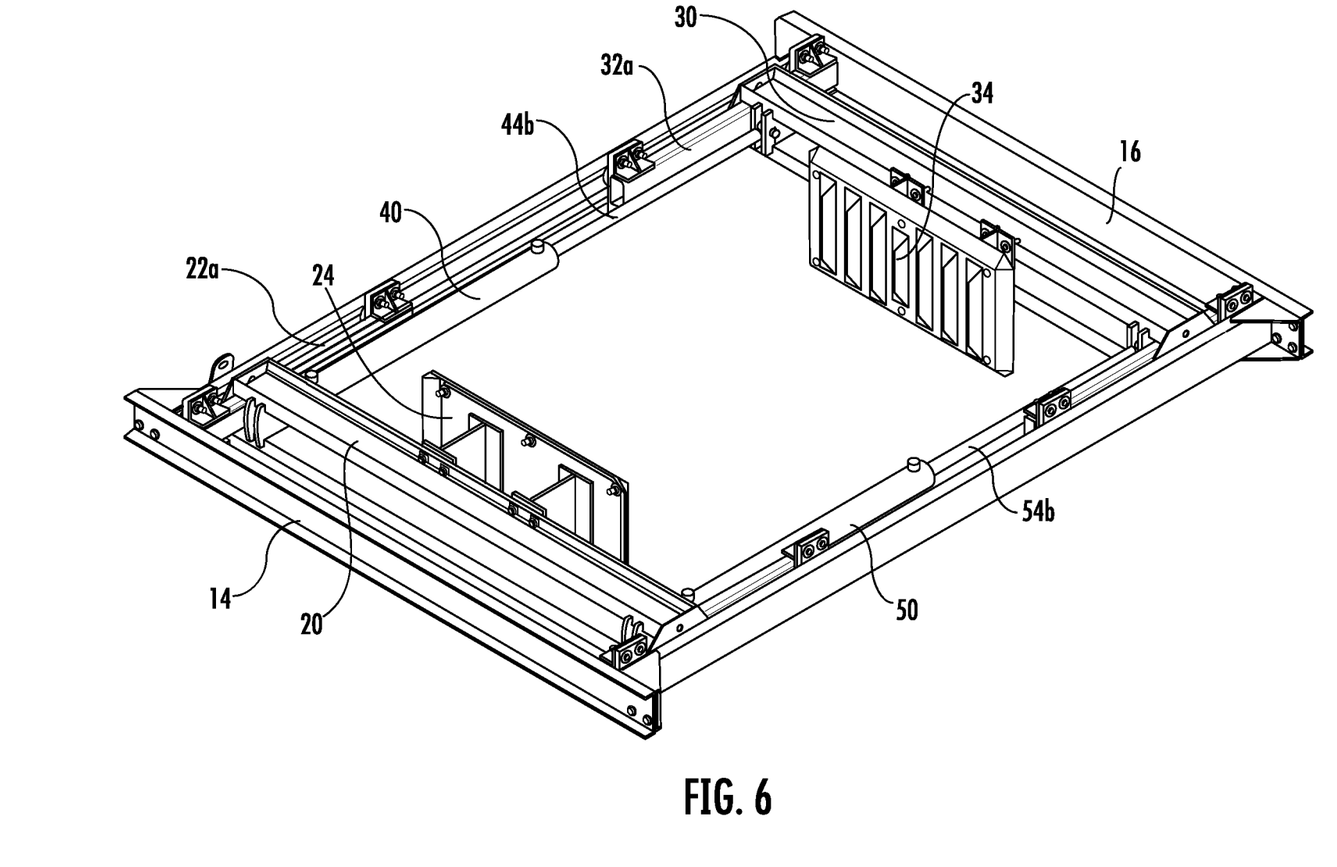
FIG. 6 is a perspective view of the frame assembly, carrier frames, and hydraulic cylinders of the bulk bag conditioner assembly in an initial state.
Figure 7:
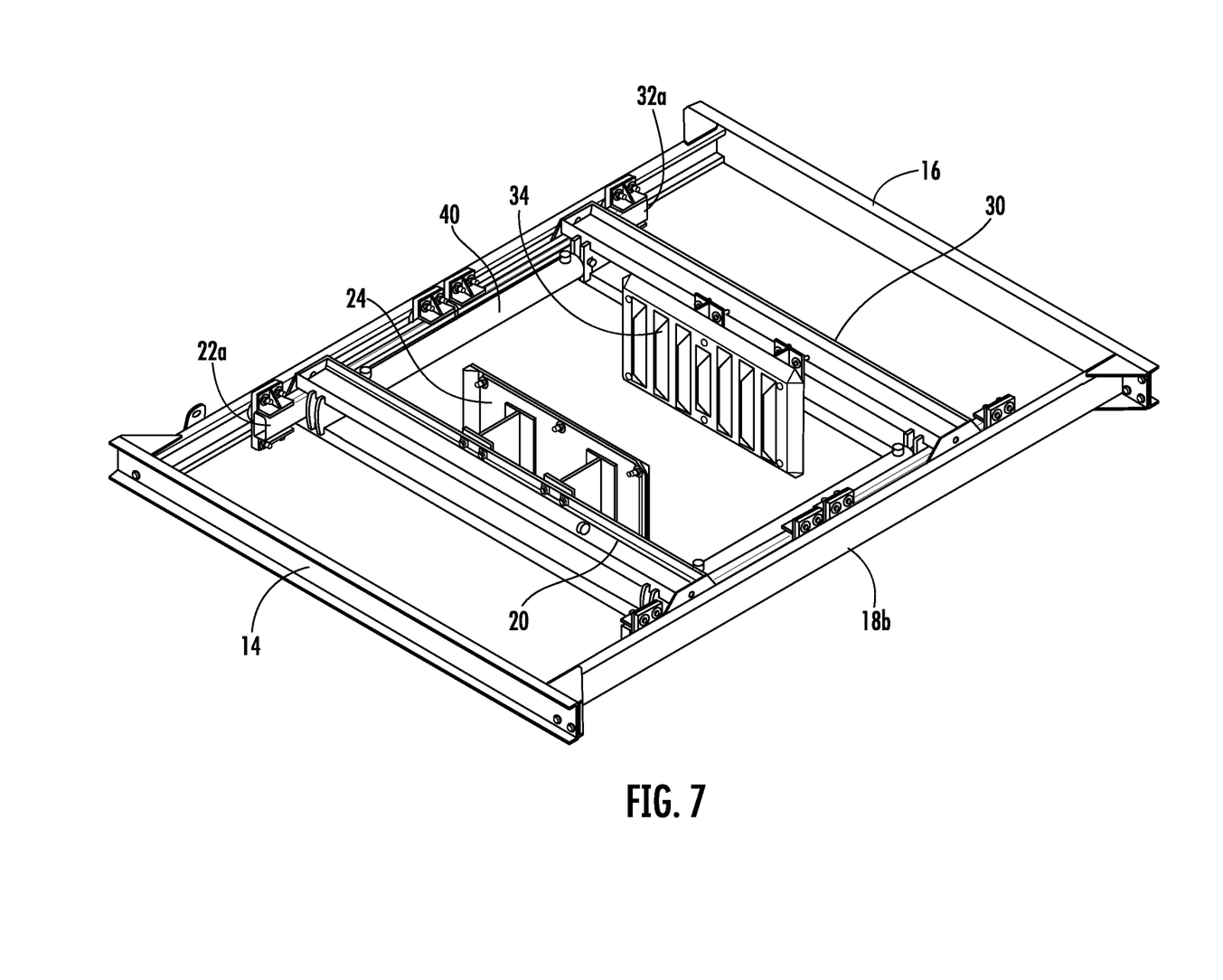
FIG. 7 is a perspective view of the frame assembly, carrier frames, and hydraulic cylinders of the bulk bag conditioner assembly in a partially compressed state.
Figure 8:
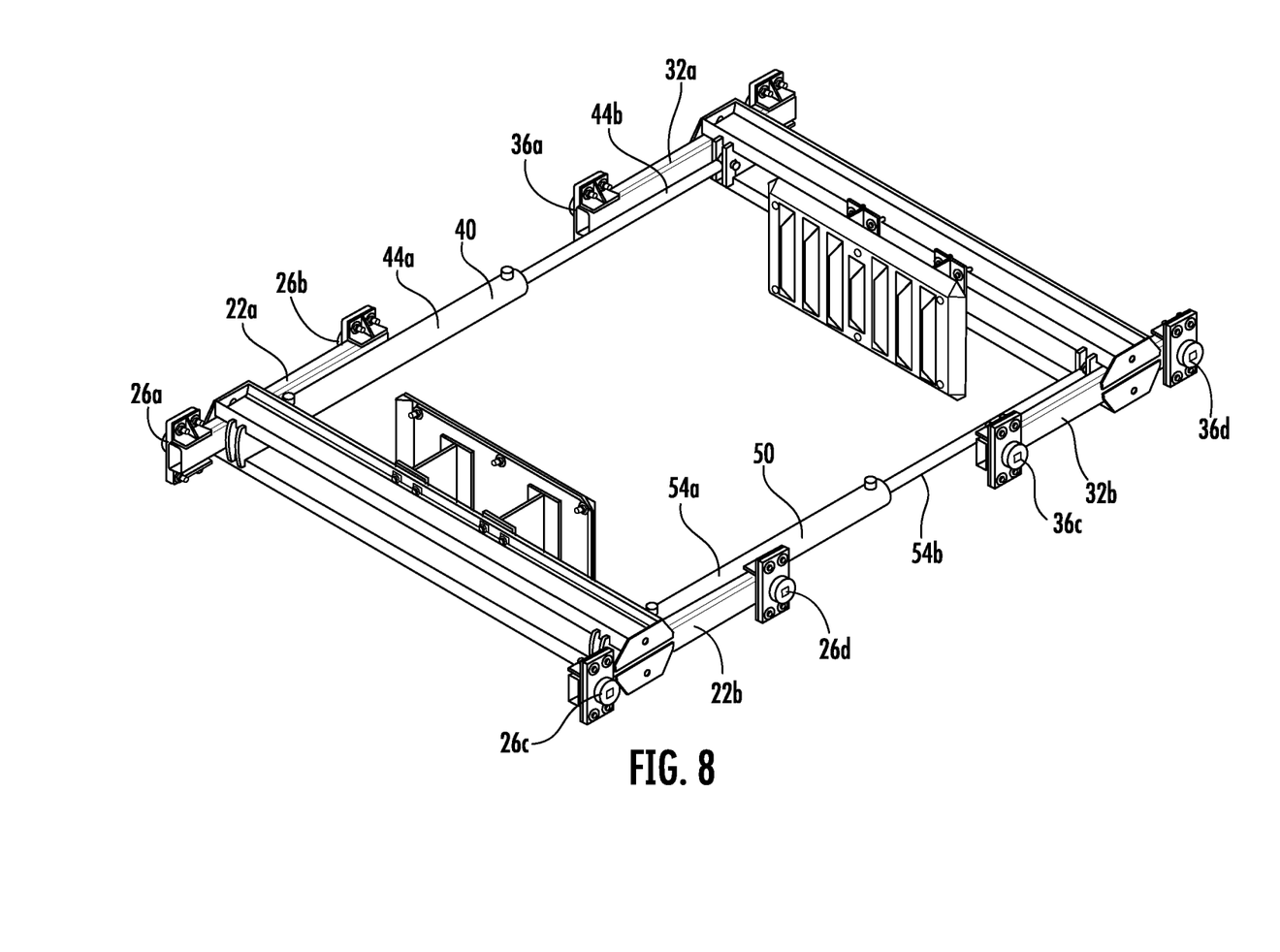
FIG. 8 is a perspective view of the carrier frames and hydraulic cylinders of the bulk bag conditioner assembly.
Figure 9:
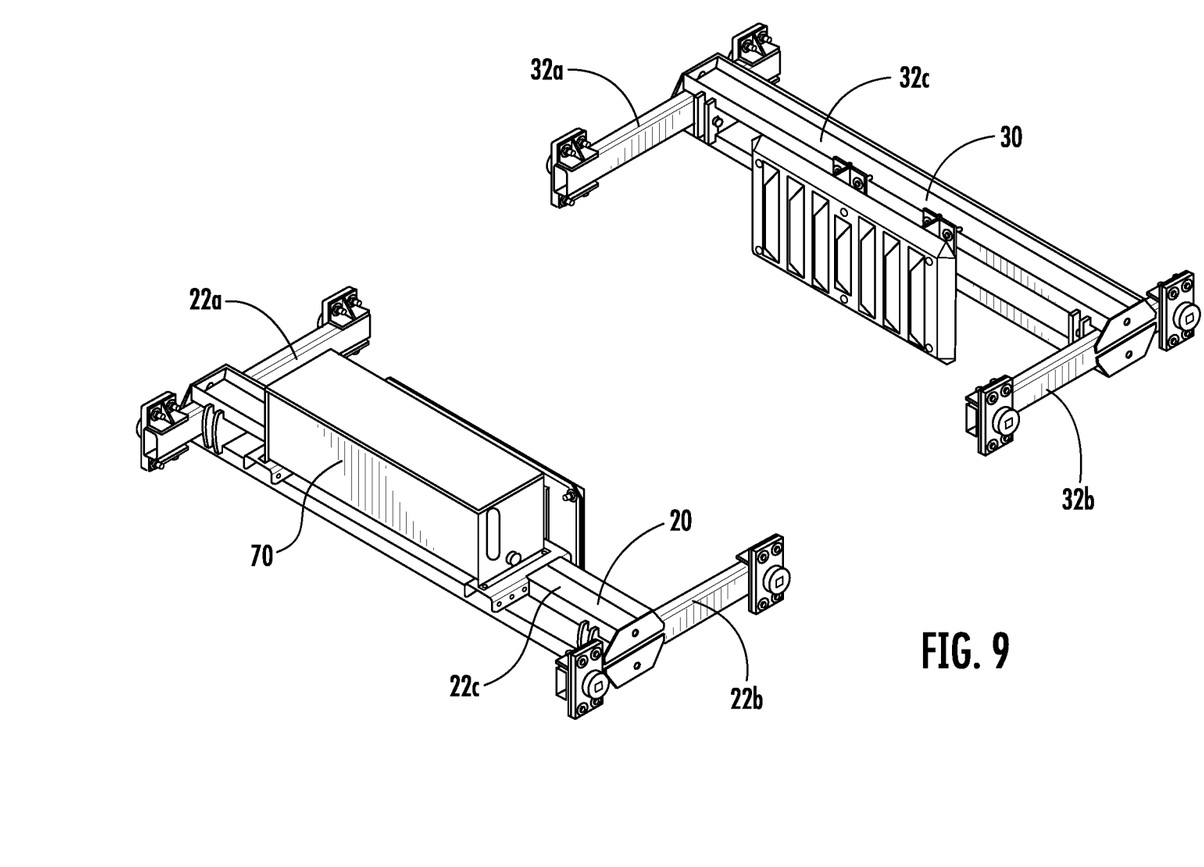
FIG. 9 is a perspective view of the carrier frames of the bulk bag conditioner assembly.
Figure 10A:
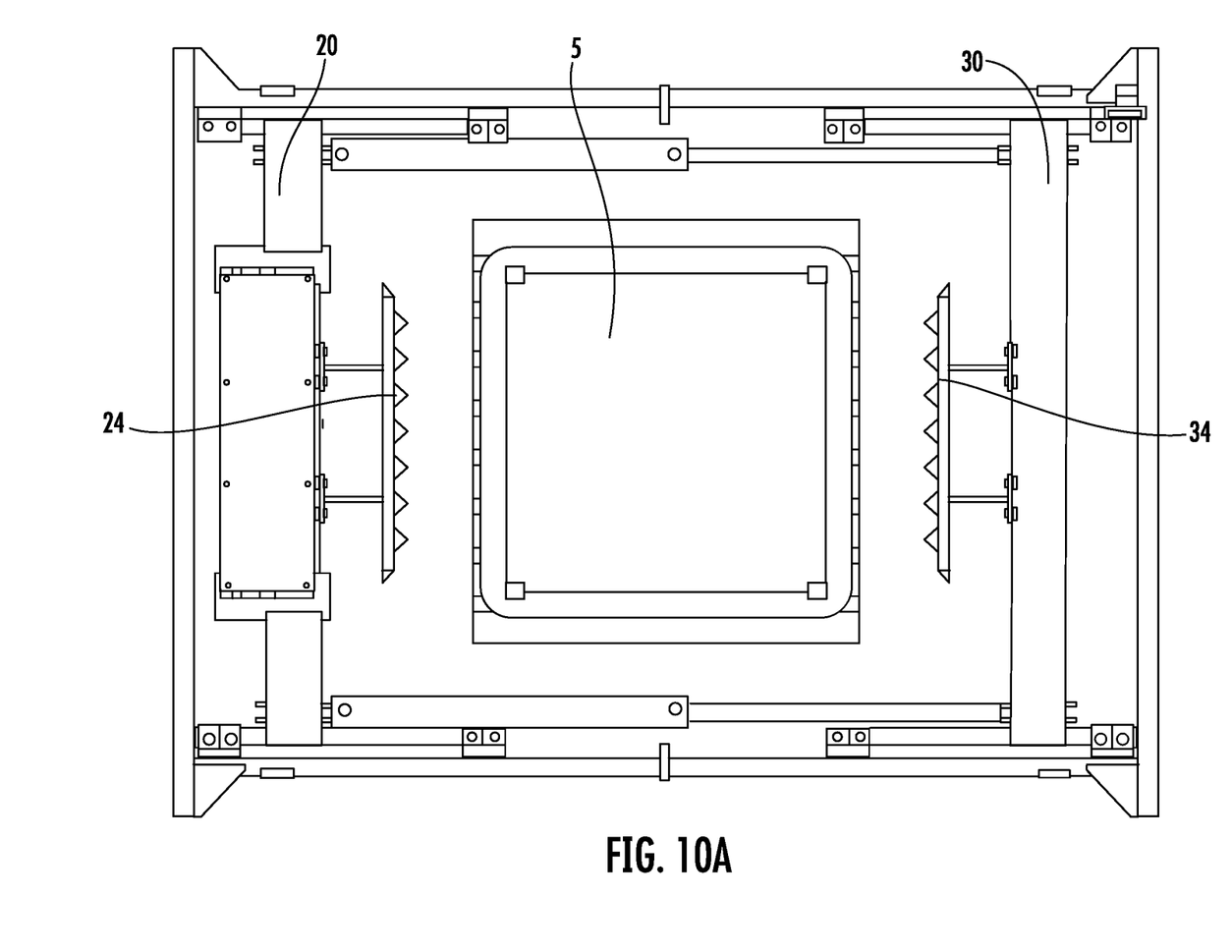
FIGS. 10A-10C are top views of the bulk bag conditioner assembly in varying states.
Figure 10B:
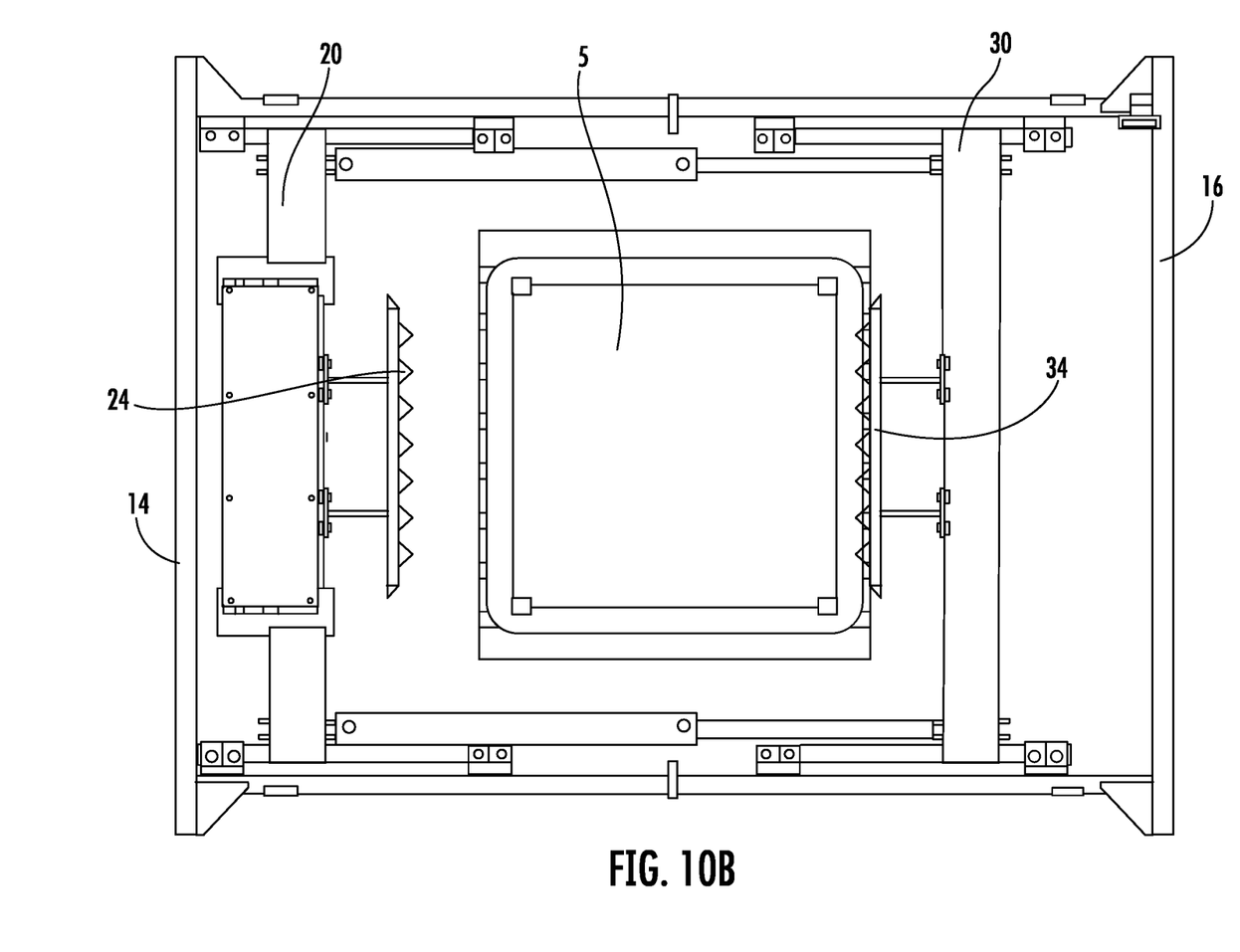
Figure 10C:
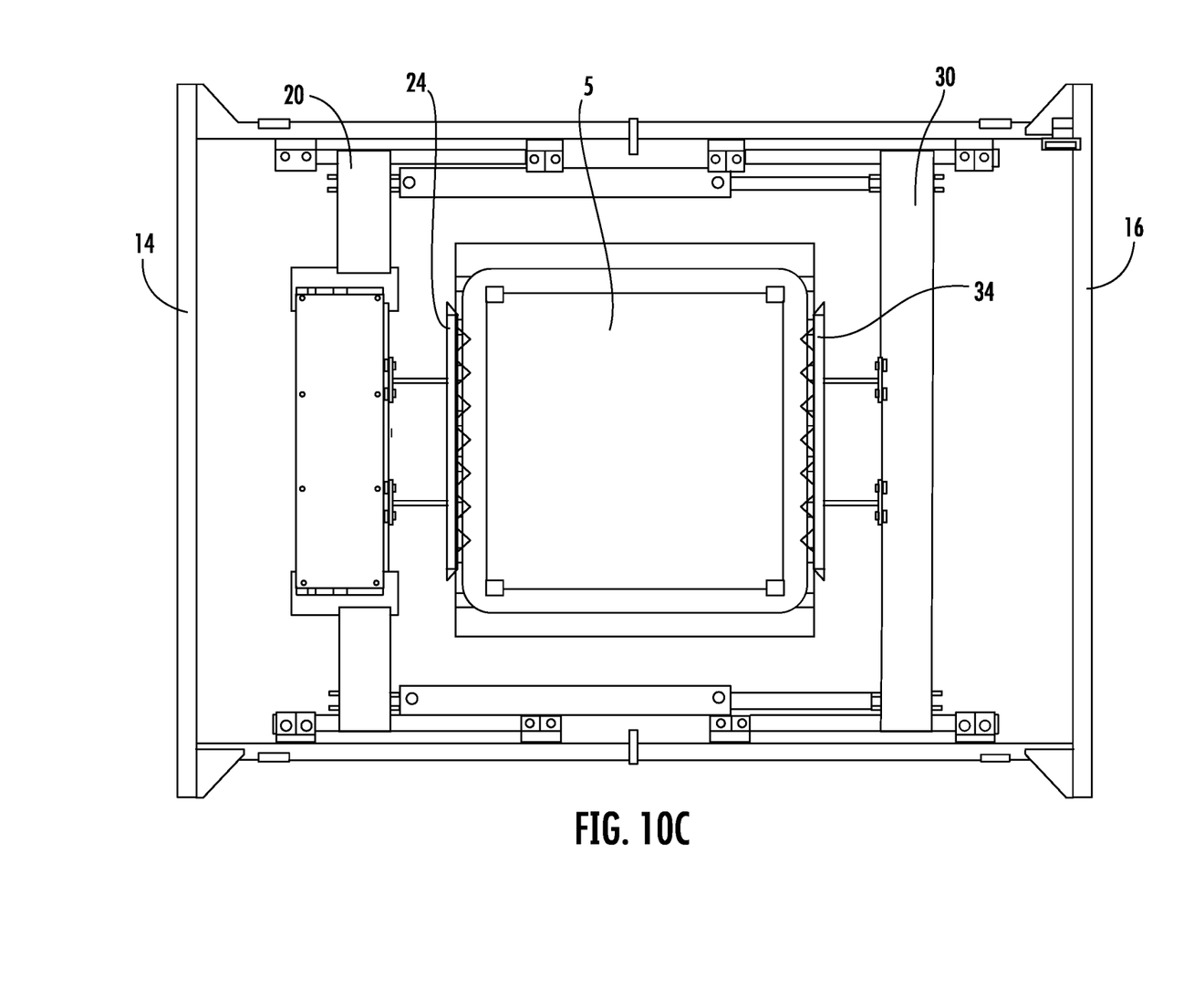

The frame assembly 12 includes a perimeter frame comprising a first support rail 14, a second support rail 16, and a pair of guide rails 18a, 18b connecting the first support rail 14 and the second support rail 16. In one aspect, the frame assembly 12 includes a plurality of rolling elements or bearing elements. Each of the guide rails 18a, 18b define roller tracks 19 that define paths configured to allow rollers 26a-26d, 36a-36d to slide along, as described in more detail herein. As shown in FIG. 5, each of the guide rails 18a, 18b can define connection regions 18c configured to be engaged by a cable, chain, wire, or other hoisting element, described in more detail herein.

The tracks 19 are dimensioned to laterally retain the rollers 26a-26d, 36a-36d while allowing the rollers 26a-26d, 36a-36d to roll longitudinally along the tracks 19. The rollers 26a-26d, 36a-36d can include a wheel component, bearings, or any other rolling configuration. In one aspect, a plain bearing block within a grooved channel can be used instead of rollers. In another aspect, linear bearings or guide shafts can be used instead of rollers. One skilled in the art would recognize that any type of guiding, rolling, or bearing interface can be provided that allows longitudinal movement.

A first and second carrier frame 20, 30 are provided that each generally support the rams 24, 34. Each of the carrier frames 20, 30 generally have an H-shaped profile and are also referred to as H-frame carriers herein.

Figure 4:
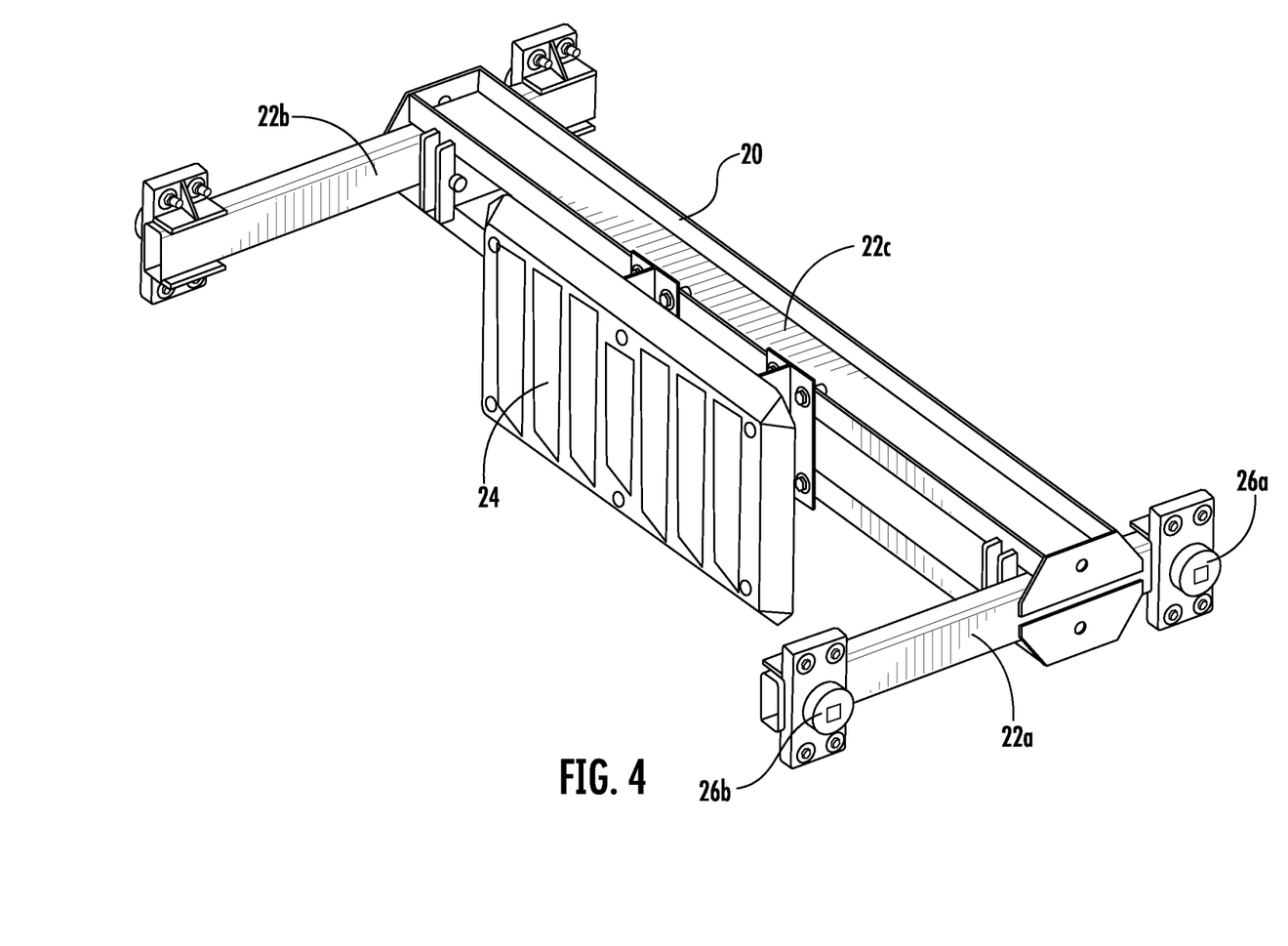
FIG. 4 is a perspective view of one carrier frame of the bulk bag conditioner assembly.

FIG. 4 illustrates the first carrier frame 20 in isolation. Although not specifically illustrated in the same manner, the second carrier frame 30 includes identical features as the first carrier frame 20. The carrier frames 20, 30 are configured to be driven towards each other via the first and second hydraulic cylinder assemblies 40, 50. The carrier frames 20, 30 are driven towards each other in a linear direction and in a common horizontal plane, in one aspect. The carrier frames 20, 30 and therefore the rams 24, 34 do not undergo any pivoting motion, in one aspect, and provides the most efficient application of compression force to the bulk bag 5. All of the force from the hydraulic cylinder assemblies 40, 50 are driven linearly from the rams 24, 34 into the bulk bag 5.

The first carrier frame 20 includes a pair of legs 22a, 22b and a first frame body 22c extending therebetween. The first frame body 22c is fixed relative to the pair of legs 22a, 22b. The first frame body 22c includes the first ram 24, preferably in a medial region of the first frame body 22c. The first carrier frame 20 is configured to be guided along the pair of guide rails 18a, 18b via a plurality of rollers 26a, 26b, 26c, 26d that slide along the tracks 19 of the guide rails 18a, 18b.

The second carrier frame 30 includes a pair of legs 32a, 32b and a second frame body 32c extending therebetween. The second frame body 32c includes the second ram 34, preferably in a medial region of the second frame body 32c. The second carrier frame 30 is configured to be guided along the pair of guide rails 18a, 18b via a plurality of rollers 36a, 36b, 36c, 36d that slide along the tracks 19 of the guide rails 18a, 18b. As mentioned above, the carrier frames 20, 30 could include alternative rolling, bearing, or rolling elements instead of rollers.

The first hydraulic cylinder assembly 40 includes a first end 42a fixed to the first frame body 22c and a second end 42b fixed to the second frame body 32c. The first hydraulic cylinder assembly 40 generally includes a rod 44b and a cylinder 44a, among other components. The hydraulic cylinder assemblies 40, 50 disclosed herein can use pressurized hydraulic fluid, such as oil, to extend and retract. Although hydraulic cylinders are described herein, one skilled in the art would recognize from the present disclosure that other forms of mechanical or electro-mechanical actuators may be used. The second hydraulic cylinder assembly 50 includes a first end 52a fixed to the first frame body 22c and a second end 52b fixed to the second frame body 32c. The second hydraulic cylinder assembly 50 similarly includes a rod 54b and a cylinder 54a, among other components. The ends 42a, 42b, 52a, 52b of the hydraulic assemblies 40, 50 can be secured relative to the respective cattier frames 20, 30 via pivoting connections, in one aspect.

In one aspect, the actuator assemblies or the hydraulic cylinder assemblies 40, 50 are mounted on opposite sides of the bulk bag or the bulk bag receiving area. In one embodiment, the actuator assemblies or the hydraulic cylinder assemblies 40, 50 are mounted on the same side relative to the bulk bag or the bulk bag receiving area. The exact positioning of the actuator assemblies or the hydraulic cylinder assemblies 40, 50 relative to each other can vary.

Figure 1:
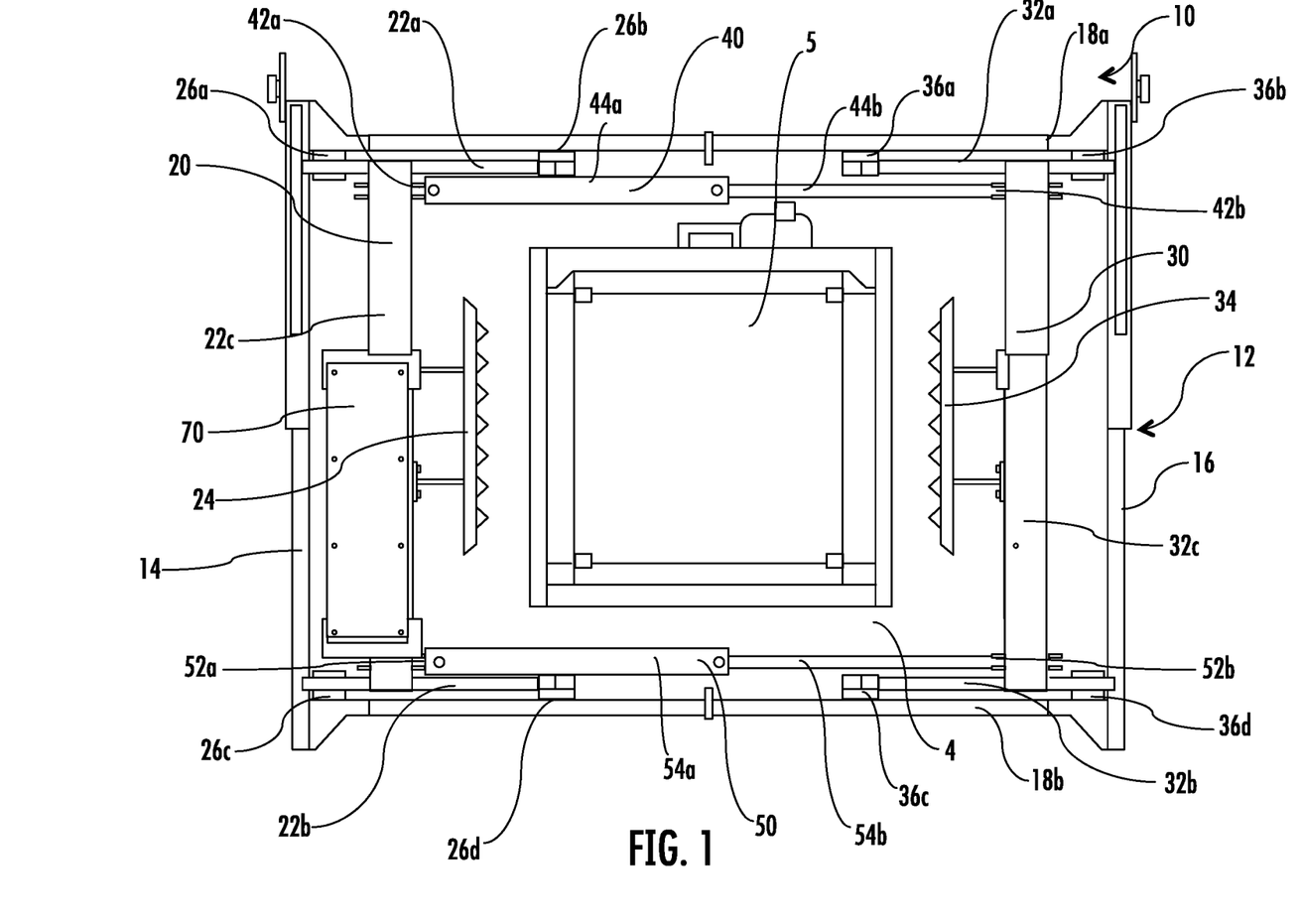
FIG. 1 is a top view of a bulk bag conditioner assembly according to one aspect.
Figure 2:
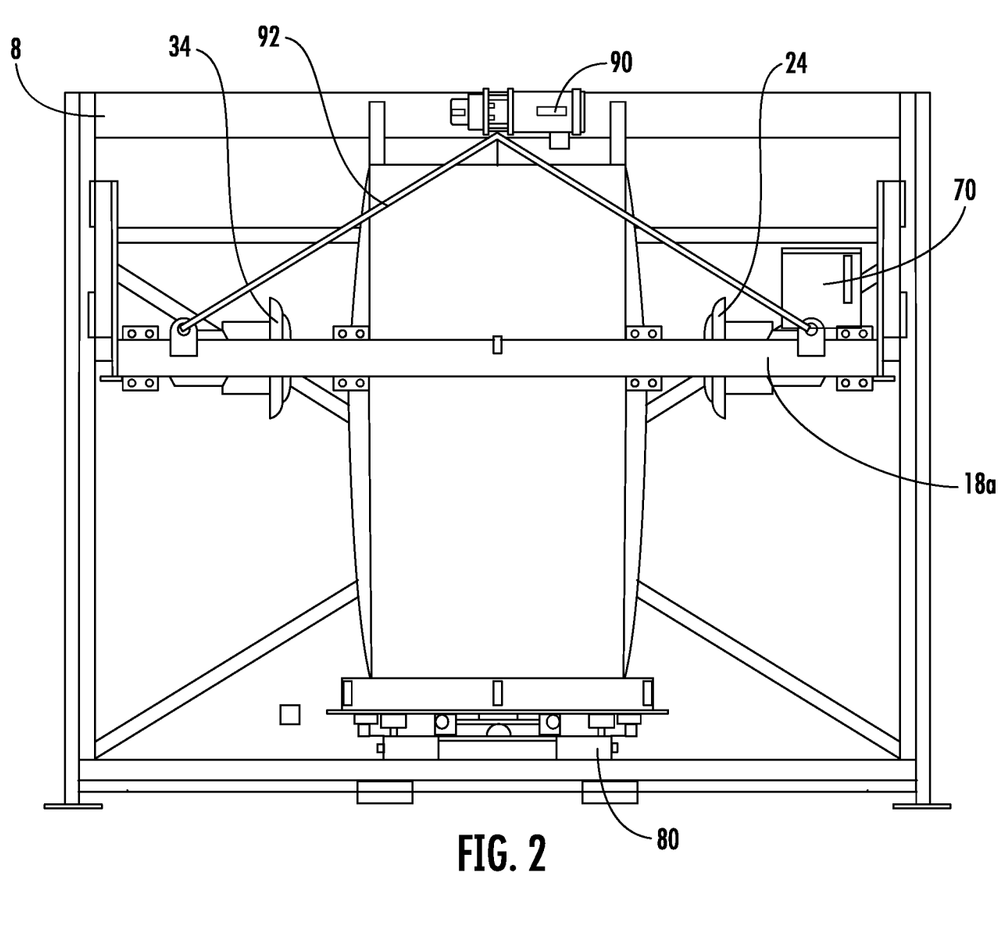
FIG. 2 is a side view of the bulk bag conditioner assembly of FIG. 1.
Figure 3:
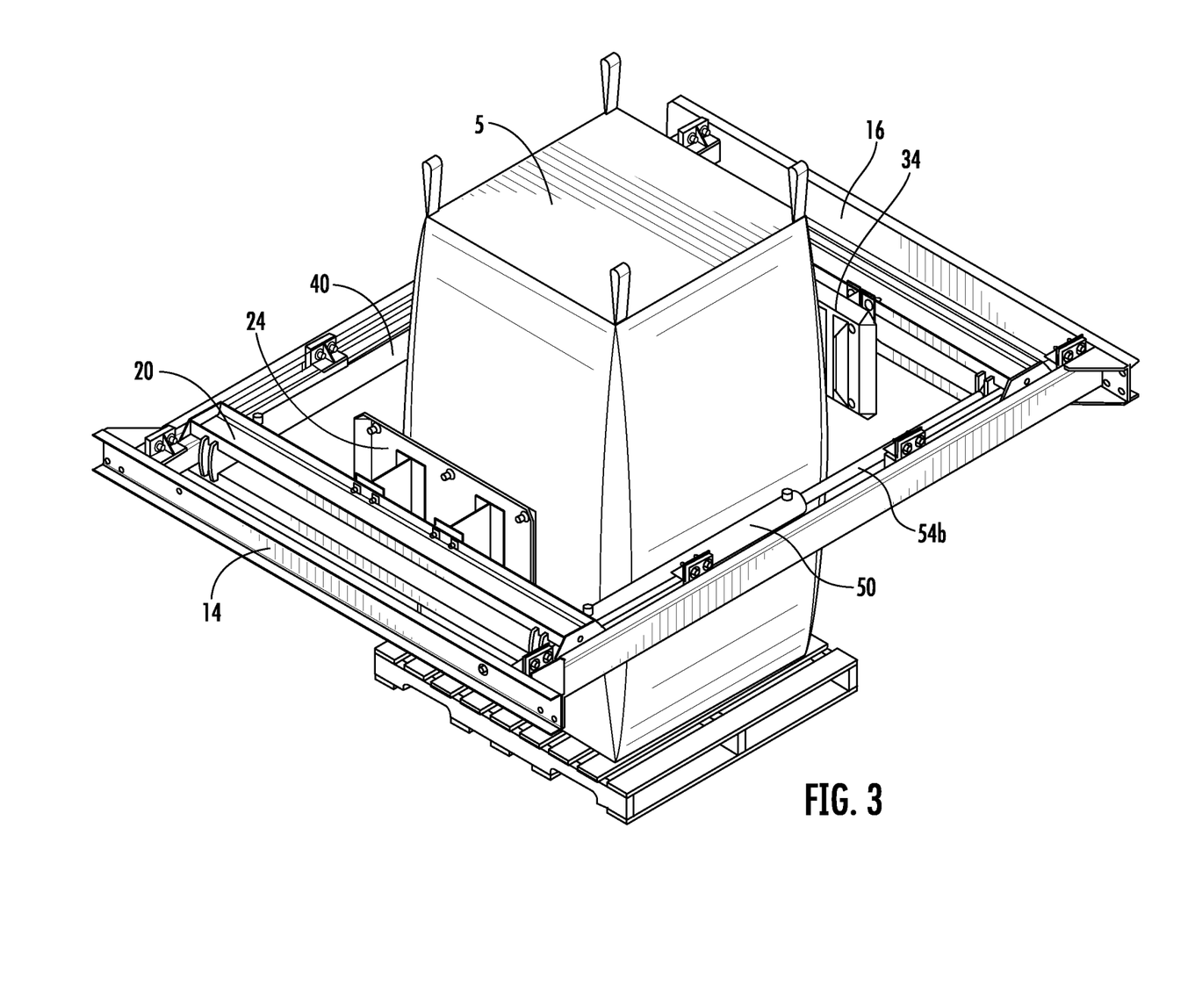
FIG. 3 is a perspective view of the bulk bag conditioner assembly.

In one aspect, the control unit or hydraulic power unit 70 is mounted directly on a carrier frame 20, 30, as shown in FIGS. 1, 2, 9, and 10A-10C. The control unit 70 is not specifically shown on the frame assembly 12 in some of the drawings only for simplicity and to show other aspects of the assembly. The control unit 70 can be mounted directly on the first frame body 22c or the second frame body 32c. One skilled in the art would understand that the control unit 70 can be mounted in any position on the bulk bag conditioner assembly 10. The control unit 70 is generally configured to control the extension and retraction of the hydraulic cylinder assemblies 40, 50, and is operatively connected to the hydraulic cylinder assemblies 40, 50. As shown in FIG. 1, the control unit 70 is mounted on a side of the assembly closer to or adjacent to the cylinders 44b, 54b of the hydraulic cylinder assemblies 40, 50 than the rods 44b, 54b.

The bulk bag conditioner assembly 10 can further include a bulk bag support base 80. The support base 80 can be configured to rotate. In one aspect, the support base 80 is vertically fixed. In one aspect, the bulk bag 5 is loaded onto a pallet, and then a forklift or other lifting means loads the pallet and the bulk bag 5 onto the support base 80.

A vertical lifting assembly 90 is also provided to raise and lower the bulk bag conditioner assembly 10. The vertical lifting assembly 90 can be fixed above a bulk bag conditioning or receiving area 4, and can be fixed to a support frame 8. The frame 8 is only configured to support the vertical lifting assembly 90, and otherwise does not provide any structural or supporting function for the bulk bag conditioner assembly 10. The vertical lifting assembly 90 can include a cable, chain, wire, or other hoisting element, illustrated as element 92 in FIG. 2. The vertical lifting assembly 90 can be remotely controlled by personnel to raise and lower the bulk bag conditioner assembly 10. In one aspect, the control unit 70 can be operatively connected to the vertical lifting assembly 90 and can control operation of the vertical lifting assembly 90. Based on this configuration, the bulk bag 5 can remain vertically stationary, and the bulk bag conditioner assembly 10 can be raised and lowered to engage specific areas of the bulk bag 5. One skilled in the art would also understand that the vertical lifting assembly 90 can be operated via another control unit, such as a control unit mounted to a stationary frame.

Bulk bags 5 typically experience elongation during conditioning, and this configuration allows upward elongation to freely occur. In other words, no downward forces or stresses are imparted onto the frame assembly 12 or the rams 24, 34. The bulk bag conditioner assembly 10 is only supported vertically via the vertical lifting assembly 90 and is otherwise freely floating and unsupported.

During an initial phase, the bulk bag conditioner assembly 10 is in a raised position such that a bag receiving or conditioning area 4 is free from any obstruction. The bulk bag 5 is then loaded onto the support base 80. Once the bulk bag 5 is placed onto the support base 80, the vertical lifting assembly 90 can then lower the bulk bag conditioner assembly 10 such that the bulk bag conditioner assembly 10 surrounds the bulk bag 5. In another aspect, the bulk bag conditioner assembly 10 can be arranged on the ground prior to loading the bulk bag 5 onto the support base 80. Once the bulk bag 5 is positioned on the support base 80, the vertical lifting assembly 90 can then raise the bulk bag conditioner assembly 10 until it surrounds the bulk bag 5.

The configuration of the hydraulic cylinder assemblies 40, 50 causes conditioning or compression forces on both sides of the bulk bag 5. The hydraulic cylinder assemblies 40, 50 are retracted to apply compressive forces to the bulk bag 5 via the rams 24, 34 by pulling the H-frame carriers 20, 30 towards each other. In other words, the hydraulic cylinder assemblies 40, 50 pull inward or retract relative to the bulk bag 5 using the rod 44b, 54b sides of the assemblies 40, 50. This configuration alleviates buckling of the hydraulic cylinder rods, which occurs in known bulk bag conditioning arrangements. In one aspect, the H-frame carriers 20, 30, the rams 24, 34, and the hydraulic cylinder assemblies 40, 50 are all arranged within a common horizontal plane. In other words, a single horizontal (i.e. generally parallel to the ground) plane extends through each of these components.

As illustrated in FIGS. 6, 7, and 10A-10C, during a crushing or conditioning cycle, the rams 24, 34 are each driven towards each other until a first one of the rams (i.e. ram 34 in FIG. 10B), engages the bulk bag 5. This configuration allows for the bulk bag 5 to not be mounted directly or perfectly center relative to the rams 24, 34 because the rams 24, 34 are commonly driven or linked via the hydraulic cylinder assemblies 40, 50. This is beneficial to personnel because it reduces the time and effort required to carry out bulk bag conditioning by not having to reposition the bulk bag until it is relatively centered within the rams, as is required in known bulk bag conditioning arrangements. Once a first one of the rams 24, 34 engages the bulk bag 5 and encounters resistance, then the opposing ram 24, 34 will continue traveling inward until the other ram 24, 34 also engages the bulk bag 5, as shown for ram 24 between FIGS. 10B and 10C. Crushing or conditioning of the bulk bag 5 will fully begin once both rams 24, 34 are securely engaged against the bulk bag 5.

Figure 11:
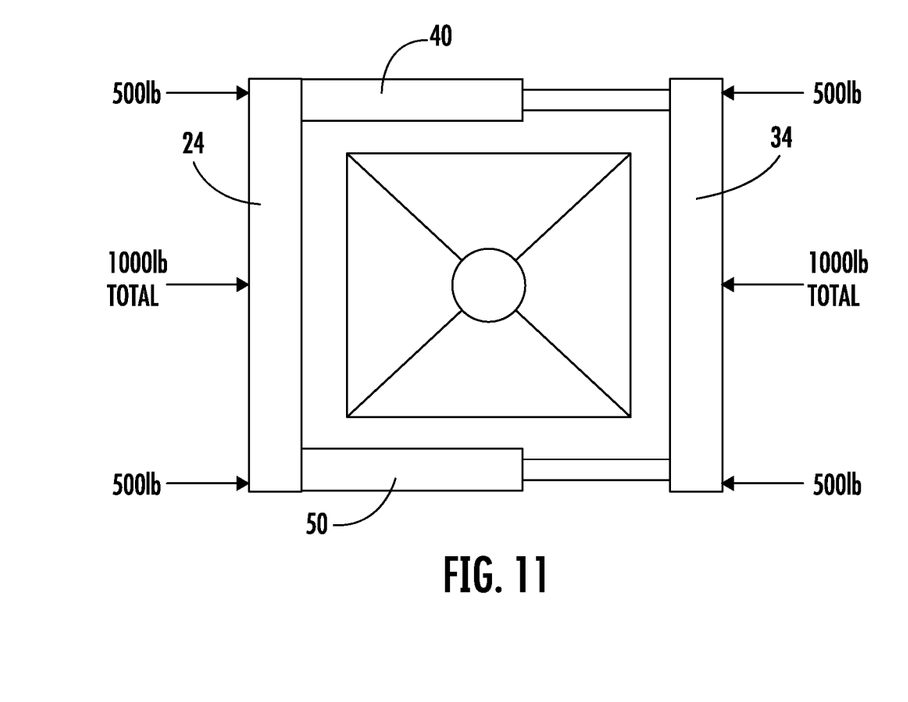
FIG. 11 illustrates one example of a force diagram showing compression forces generated by the bulk bag conditioner assembly.

Instead of the hydraulic cylinder assemblies 40, 50 pushing off of a surrounding frame or external cage, reactionary forces from an opposite one of the hydraulic cylinder assemblies 40, 50 are provided to the bulk bag 5. This results in a 2:1 loading of the bulk bag 5 (as illustrated by FIG. 11), and allows for higher forces to be applied, or allows for relatively smaller and cheaper hydraulic cylinder assemblies to be used as compared to known bulk bag conditioning arrangements.

The present configuration lacks any surrounding external cage or frame relative to the bulk bag conditioner assembly 10. The assembly 10 is essentially free-standing except for a vertical support (such as a lifting assembly to raise and lower the assembly 10). This configuration is possible, in part, due to the closed perimeter provided by the bulk bag conditioner assembly 10. The perimeter frame (i.e., the first support rail 14, second support rail 16, and pair of guide rails 18a, 18b connecting the first support rail 14 and the second support rail 16) has a continuous and enclosed perimeter dimensioned to define a bulk bag receiving or conditioning area 4. In other words, the bulk bag conditioner assembly 10 completely surrounds the bulk bag 5, and therefore the bag 5 is prevented from tipping over or falling, and provides enhanced safety measures for personnel operating the bulk bag conditioner assembly 10. There is also no requirement for an external or surrounding cage structure due to the hydraulic assemblies 40, 50 retracting and not extending off of some outer or supporting structure.

The rams 24, 34 are free floating based on the configuration of the bulk bag conditioner assembly 10. Based on this configuration, the rams 24, 34 self-center over the bulk bag 5 during crushing or conditioning. Additionally, elongation of the bulk bag 5 that occurs during conditioning is permitted to occur without restraint or resistance in an upward direction if the bulk bag 5 is pulled upward via a vertical lifting assembly or driven upwards via a unidirectional lifting device.

The hydraulic cylinder assemblies 40, 50 are actuated to drive the rams 24, 34 towards each other. This arrangement isolates the associated forces on the hydraulic cylinder assemblies 40, 50. The input forces on the bulk bag 5 are at least doubled compared to known arrangements due to the rams 24, 34 being linked or conjoined via the hydraulic cylinder assemblies 40, 50.

FIG. 11 illustrates a schematic diagram indicating the force applied by the rams 24, 34 via the hydraulic cylinder assemblies 40, 50. In this diagram, each of the hydraulic cylinder assemblies 40, 50 provides 500 pounds of force, and the rams 24, 34 each provide 1,000 pounds of force to the sides of the bulk bag.

A method of conditioning a bulk bag is also disclosed herein. The method includes providing a bulk bag conditioner assembly 10 comprising a frame assembly 12 that includes a perimeter frame having an enclosed perimeter. The frame assembly 12 includes a first ram 24, a second ram 34, and a hydraulic cylinder assembly 40, 50 commonly linked to both the first ram 24 and the second ram 34. A vertical lifting assembly 90 is configured to raise and lower the bulk bag conditioner assembly 10.

The method includes positioning a bulk bag 5 either above or below the bulk bag conditioner assembly 10. This step depends on the initial position of the bulk bag conditioner assembly 10. If the initial position of the bulk bag conditioner assembly 10 is in a raised position, then the bulk bag 5 is positioned below the bulk bag conditioner assembly 10. Alternatively, if the initial position of the bulk bag conditioner assembly 10 is on the ground surface, then the bulk bag 5 is positioned above the bulk bag conditioner assembly 10. In either state, the bulk bag 5 can be loaded onto a support base 80.

The method then includes either raising or lowering the bulk bag conditioner 10 via the vertical lifting assembly 90 such that the first ram 24 and the second ram 34 are facing at least a portion of the bulk bag 5. The exact position of the rams 24, 34 relative to the bulk bag 5 can vary and can depend on which areas of the bulk bag 5 need to be conditioned.

The method includes activating the hydraulic cylinder assembly 40, 50 such that the first ram 24 and the second ram 34 are simultaneously driven linearly towards each other and engage the bulk bag 5 to condition the bulk bag 5.

The method can further include rotating the support base 80 to rotate the bulk bag 5 such that the first and second rams 24, 34 can engage all sides and corners of the bulk bag 5. The method can further include providing any one or more of the other components described herein.

It is also understood that various portions of the invention can be used alone or in combination and that not all of the components are required for any particular application. It is therefore understood that this invention is not limited to the particular embodiments disclosed, but it is intended to cover modifications within the spirit and scope of the present invention.

What is claimed is:

1. A bulk bag conditioner assembly comprising:
   a frame assembly defining a bulk bag conditioning area, the frame assembly including a first carrier frame including a first ram, and a second carrier frame including a second ram,
   a first actuator assembly including a first end fixed to the first carrier frame and a second end fixed to the second carrier frame, and
   a second actuator assembly including a first end fixed to the first carrier frame and a second end fixed to the second carrier frame,
   wherein the first and second actuator assemblies simultaneously drive the first ram and the second ram linearly towards each other to engage a bulk bag within the bulk bag conditioning area.

2. The bulk bag conditioner assembly according to claim 1, wherein the frame assembly includes a perimeter frame having a continuous and enclosed perimeter dimensioned to define the bulk bag conditioning area.

3. The bulk bag conditioner assembly according to claim 1, further comprising a control unit configured to drive the first and second actuator assemblies, wherein the control unit is mounted directly on one of: the first carrier frame or the second carrier frame.

4. The bulk bag conditioner assembly according to claim 1, wherein the first and second carrier frames each include a plurality of rolling elements or bearing elements.

5. The bulk bag conditioner assembly according to claim 4, wherein the frame assembly further comprises a perimeter frame including a first support rail, a second support rail, and a pair of guide rails connecting the first support rail and the second support rail, and the pair of guide rails each define roller tracks configured to define rolling paths for the plurality of rollers of the first and second carrier frames.

6. The bulk bag conditioner assembly according to claim 1, further comprising a vertical lifting assembly configured to raise and lower the frame assembly.

7. The bulk bag conditioner assembly according to claim 1, wherein the first actuator assembly is arranged on a first side of the frame assembly, and the second actuator assembly is arranged on a second side of the frame assembly, the second side being opposite from the first side.

8. The bulk bag conditioner assembly according to claim 1, wherein the first carrier frame has a H-shaped profile including a first pair of legs and a first frame body extending therebetween, the first pair of legs each including a first plurality of rollers, the second carrier frame has a H-shaped profile including a second pair of legs and a second frame body extending therebetween, the second pair of legs each including a second plurality of rollers.

9. The bulk bag conditioner assembly according to claim 8, wherein the first and second plurality of rollers are provided on terminal ends of a respective one of the first and second pair of legs of the first and second carrier frames.

10. The bulk bag conditioner assembly according to claim 1, further comprising a support base configured to support a bulk bag arranged within the frame assembly, and a vertical lifting assembly configured to raise and lower the frame assembly, wherein the support base is configured to rotate and is vertically fixed.

11. The bulk bag conditioner assembly according to claim 1, wherein the bulk bag conditioner assembly is suspended via a vertical lifting assembly and is otherwise unsupported.

12. The bulk bag conditioner assembly according to claim 1, wherein the first and second carrier frames, the first and second rams, and the first and second actuator assemblies are each arranged within a common horizontal plane.

13. The bulk bag conditioner assembly according to claim 1, wherein the first and second actuator assemblies are hydraulic cylinder actuators.

14. A bulk bag conditioner assembly comprising:
a vertically adjustable frame assembly including a perimeter frame defining a bulk bag conditioning area having an enclosed perimeter, the frame assembly including a first ram and a second ram, and
an actuator assembly connected to both the first ram and the second ram, such that the first ram and the second ram are configured to be simultaneously driven linearly towards each other to engage a bulk bag within the bulk bag conditioning area.

15. The bulk bag conditioner assembly according to claim 14, wherein the perimeter frame comprises a first support rail, a second support rail, and a pair of guide rails connecting the first support rail and the second support rail,
the first ram being connected to a first carrier frame, the second ram being attached to a second carrier frame, and
the pair of guide rails each define roller tracks configured to define paths for a plurality of rollers connected to the first carrier frame and the second carrier frame.

16. The bulk bag conditioner assembly according to claim 14, further comprising a support base configured to support a bulk bag arranged within the frame assembly, and a vertical lifting assembly configured to raise and lower the frame assembly relative to the bulk bag, wherein the support base is configured to rotate and is vertically fixed.

17. The bulk bag conditioner assembly according to claim 14, further comprising a control unit configured to drive the first ram and the second ram to engage the bulk bag, wherein the control unit is mounted directly on the frame assembly.

18. The bulk bag conditioner assembly according to claim 14, wherein the actuator assembly, the first ram, and the second ram are each arranged in a common horizontal plane.

19. A method of conditioning a bulk bag, the method comprising:
providing a bulk bag conditioner assembly including:
a frame assembly including a perimeter frame having an enclosed perimeter, the frame assembly including a first ram, a second ram, and an actuator assembly commonly linked to both the first ram and the second ram, and
a vertical lifting assembly configured to raise and lower the bulk bag conditioner assembly;
positioning a bulk bag above or below the bulk bag conditioner assembly;
raising or lowering the bulk bag conditioner via the vertical lifting assembly such that the first ram and the second ram are facing at least a portion of the bulk bag; and
activating the actuator assembly such that the first ram and second ram are simultaneously driven linearly towards each other and engage the bulk bag to condition the bulk bag.

20. The method of claim 19, further comprising providing a support base, positioning the bulk bag on the support base, and rotating the bulk bag via the support base.

* * * * *